(12) United States Patent
Kim et al.

(10) Patent No.: US 12,493,013 B2
(45) Date of Patent: Dec. 9, 2025

(54) DNA ANALYSIS DEVICE

(71) Applicant: LG Display Co., Ltd., Seoul (KR)

(72) Inventors: Wonrae Kim, Paju-si (KR); MuSun Kwak, Paju-si (KR); KyeongJin Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 313 days.

(21) Appl. No.: 18/339,196

(22) Filed: Jun. 21, 2023

(65) Prior Publication Data
US 2023/0417698 A1    Dec. 28, 2023

(30) Foreign Application Priority Data
Jun. 23, 2022   (KR) .......................... 10-2022-0076588

(51) Int. Cl.
*G01N 27/327* (2006.01)
*B82Y 15/00* (2011.01)
*G01N 33/487* (2006.01)

(52) U.S. Cl.
CPC .......... *G01N 27/3278* (2013.01); *B82Y 15/00* (2013.01); *G01N 33/48721* (2013.01)

(58) Field of Classification Search
CPC ............. H03K 17/941; G01N 27/3278; G01N 33/48721; B82Y 15/00; G01J 1/48
See application file for complete search history.

(56) References Cited

U.S. PATENT DOCUMENTS

| | | | | |
|---|---|---|---|---|
| 6,069,727 | A * | 5/2000 | Cho ..................... | G02B 26/105 359/198.1 |
| 2008/0111466 | A1* | 5/2008 | Cho ....................... | H01J 31/127 313/495 |
| 2010/0142259 | A1* | 6/2010 | Drndic ................ | H01L 21/0337 365/158 |
| 2017/0146510 | A1* | 5/2017 | Ikeda ............... | G01N 27/44791 |
| 2019/0242846 | A1* | 8/2019 | Taniguchi ................ | C12M 1/00 |

(Continued)

FOREIGN PATENT DOCUMENTS

| | | |
|---|---|---|
| CN | 102262991 B | 1/2013 |
| JP | 2019525766 A | 9/2019 |
| KR | 102273813 B1 | 7/2021 |

OTHER PUBLICATIONS

Serak et al., "Liquid crystalline polymer cantilever oscillators fueled by light," Soft Matter, 2010, 6, 779-783 (Year: 2010).*

(Continued)

*Primary Examiner* — Alexander S Noguerola
(74) *Attorney, Agent, or Firm* — Seed Intellectual Property Law Group LLP

(57) ABSTRACT

According to an aspect of the present disclosure, a DNA analysis device includes a substrate; a photosensitive organic layer configured to be disposed on the substrate, and expanded or contracted by reacting to light; a pair of sensing electrodes disposed on the photosensitive organic layer, and spaced apart from each other with a nano gap; and a light irradiation unit configured to irradiate the light to the photosensitive organic layer, and when the photosensitive organic layer is deformed, the nano gap between the pair of sensing electrodes is varied. Accordingly, the nano gap is simply and precisely adjusted by using the photosensitive organic layer which reacts to light to enhance DNA analysis accuracy.

17 Claims, 11 Drawing Sheets

(56) References Cited

U.S. PATENT DOCUMENTS

2020/0381144 A1   12/2020  Kim et al.
2021/0270762 A1*  9/2021  Tsutsui .................. B82Y 15/00
2022/0187244 A1*  6/2022  Taniguchi .......... G01N 27/3278

OTHER PUBLICATIONS

Li et al., "Arbitrary Beam Steering Enabled by Photomechanically Bendable Cholesteric Liquid Crystal Polymers," Adv. Optical Mater. 2017, 5, 1600824 (Year: 2017).*

* cited by examiner

DNA ANALYSIS DEVICE

CROSS-REFERENCE TO RELATED APPLICATIONS

This application claims the priority of Korean Patent Application No. 10-2022-0076588 filed on Jun. 23, 2022, in the Korean Intellectual Property Office, the disclosure of which is incorporated herein by reference.

BACKGROUND

Technical Field

The present disclosure relates to a deoxyribonucleic acid (DNA) analysis device, and more particularly, to a DNA analysis device capable of controlling a nano gap.

Description of the Related Art

In recent years, a technology of analyzing a DNA sequence has been used in health fields such as personalized medical services and disease treatment. Gene information can be decrypted through DNA base sequence analysis, and based on this, personal medicine development and disease treatment can be performed, and gene-related technologies can be developed.

Initially, the Sanger method was used, which cuts a gene into small units and chemically amplifies the cut genes, and then analyzes the cut gene units through labeling, but the Sanger method is slow and expensive. Thereafter, analysis time was significantly reduced by development of a cyclic-array method that improved the Sanger method through parallelization. However, such a method is still associated with large cost and long time, and has a problem in that rapid DNA diagnosis is difficult.

In recent years, a nano technology has been developed and research on a DNA sequence analysis method using a nano device has been underway, and an interest in an analysis device having a nano gap among them has increased. When DNA passes between electrodes with the nano gap, instantaneous electrical current is measured to quickly analyze a base sequence.

BRIEF SUMMARY

The inventors have identified that it is difficult to control the nano gap accurately.

A benefit achieved by the present disclosure is to provide a DNA analysis device capable of controlling a nano gap between a pair of sensing electrodes.

Another benefit achieved by the present disclosure is to provide a DNA analysis device capable of precisely aligning a tip electrode of each of a pair of sensing electrodes.

Yet another benefit achieved by the present disclosure is to provide a DNA analysis device capable of minimizing or reducing noise and controlling the nano gap.

Still yet another benefit achieved by the present disclosure is to provide a DNA analysis device capable of quickly and precisely analyzing a base sequence of DNA.

Further yet another benefit achieved by the present disclosure is to provide a DNA analysis device capable of easily controlling the nano gap between a pair of sensing electrodes by using a photosensitive organic layer which is expanded by light.

Benefits of the present disclosure are not limited to the above-mentioned benefits, and other benefits, which are not mentioned above, can be clearly understood by those skilled in the art from the following descriptions.

In order to achieve the benefits, according to an aspect of the present disclosure, a DNA analysis device includes a substrate; a photosensitive organic layer configured to be disposed on the substrate, and expanded or contracted by reacting to light; a pair of sensing electrodes disposed on the photosensitive organic layer, and spaced apart from each other with a nano gap; and a light irradiation unit configured to irradiate the light to the photosensitive organic layer, and when the photosensitive organic layer is deformed, the nano gap between the pair of sensing electrodes is varied. Accordingly, the nano gap is simply and precisely adjusted by using the photosensitive organic layer which reacts to light to enhance DNA analysis accuracy.

In accordance with various embodiments, a device includes: a first tip electrode including a first nanowire; a second tip electrode including a second nanowire; a nano gap separating the first tip electrode from the second tip electrode; an insulating layer underlying the first tip electrode and the second tip electrode; a groove in the insulating layer, the groove overlapping the first and second tip electrodes; a photosensitive organic layer underlying the insulating layer; and a controller operable to direct polarized light onto the photosensitive organic layer while a deoxyribonucleic acid (DNA) strand passes through the nano gap.

In accordance with various embodiments, a method includes: forming a photosensitive organic layer on a flexible substrate; forming an insulating layer on the photosensitive organic layer; forming a groove in the insulating layer; forming a nanowire on the insulating layer on either side of the groove and extending across the groove; and forming a pair of tip electrodes separated by a nano gap by passing an electrical current through the nanowire.

Other detailed matters of the example embodiments are included in the detailed description and the drawings.

According to the present disclosure, the nano gap between a pair of sensing electrodes may be precisely controlled.

According to the present disclosure, a deformation direction of the photosensitive organic layer and the nano gap may be easily controlled by adjusting a polarization direction of light irradiated to the photosensitive organic layer.

According to the present disclosure, a location of the tip electrode of each of a pair of sensing electrodes may be precisely aligned.

According to the present disclosure, the noise can be minimized or reduced and the nano gap may be controlled at the time of analyzing DNA.

According to the present disclosure, a DNA base sequence may be quickly and precisely analyzed.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
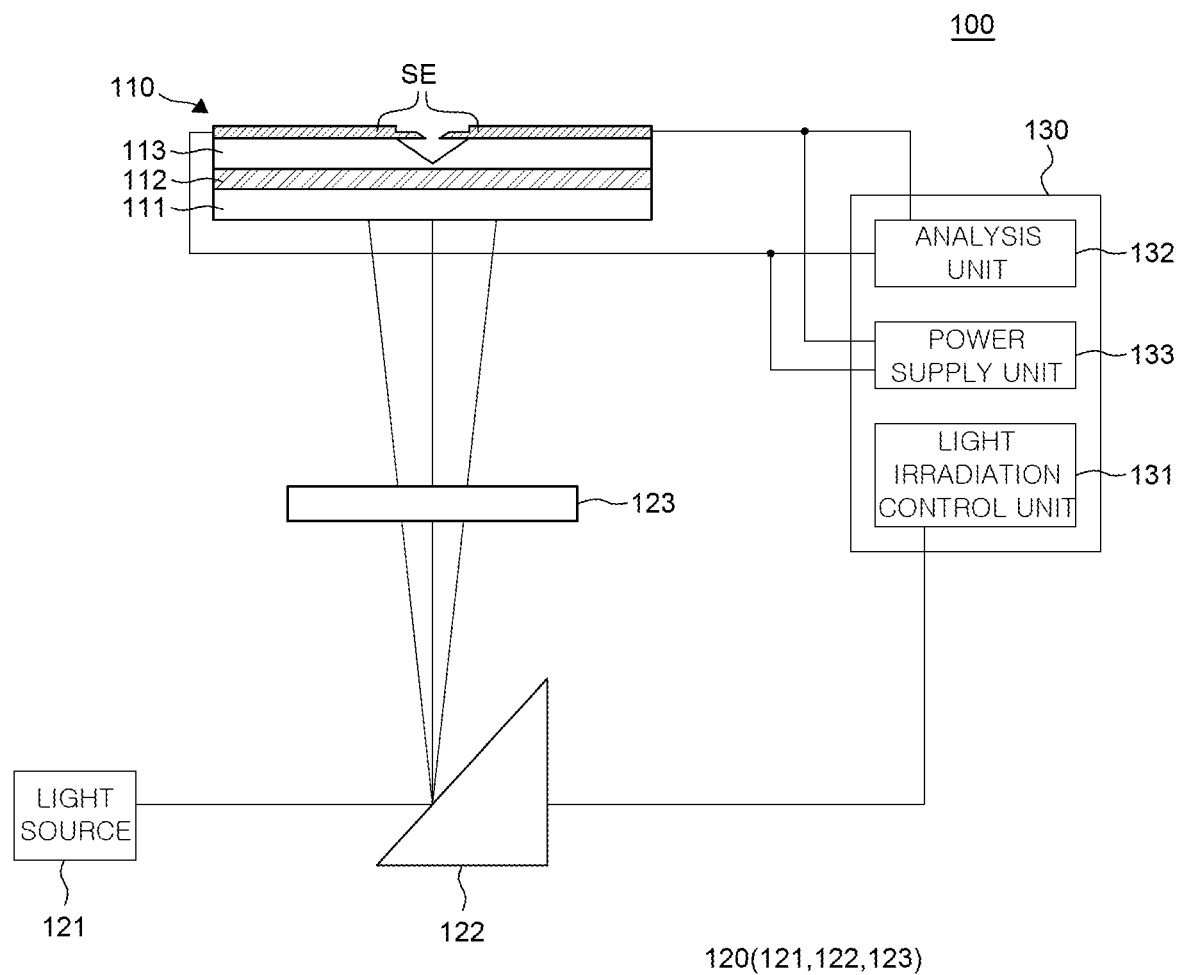
FIG. 1 is a schematic diagram of a DNA analysis device according to an example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a DNA analysis device according to example embodiments of the present disclosure will be described in detail with reference to accompanying drawings.

FIG. 1 is a schematic diagram of a DNA analysis device according to an example embodiment of the present disclosure.

The DNA analysis device 100 is a device that analyzes a base sequence of DNA by using a nano gap. The DNA analysis device 100 detects a change of current which varies depending on each base when the DNA passes through the nano gap between a pair of sensing electrodes SE to analyze the base sequence of DNA.

Referring to FIG. 1, the DNA analysis device 100 includes a main body 110 including a pair of sensing electrodes SE spaced apart from each other with the nano gap G, a light irradiation unit or assembly 120 irradiating light to the main body 110 to control the nano gap G, and a control unit or control circuit or controller 130 controlling the main body 110 and the light irradiation unit 120.

The main body 110 is a diagnosis kit into which DNA to be analyzed is input. The main body 110 may include a pair of sensing electrodes SE having the nano gap G, and analyze the base sequence of the DNA by a scheme of detecting the current change when the DNA passes through the nano gap G between a pair of sensing electrodes SE. In addition, the main body 110 may include a photosensitive organic layer 112 that is deformed in response to the light and adjusts the nano gap G by a scheme of deforming the photosensitive organic layer 112. The main body 110 including the photosensitive organic layer 112 will be described below in more detail with reference to FIGS. 2A to 4.

The light irradiation unit 120 is a component that irradiates the light to the main body 110 to control the nano gap G. The light irradiation unit 120 may selectively irradiate the light to the main body 110 according to the control by the control unit 130. The light irradiation unit 120 includes a light source 121, a digital micro mirror 122, and a polarizer 123.

The light source 121 is operable to generate light having a wavelength band that may cause a reaction in the photosensitive organic layer 112 of the main body 110. The light from the light source 121 may be incident on the main body 110 via the digital micro mirror 122 and the polarizer 123 and the photosensitive organic layer 112 of the main body 110 may be deformed in response to light. Meanwhile, the photosensitive organic layer 112 has a different wavelength band of a light which reacts to a material. Therefore, the light source 121 may be variously designed by considering the material of the photosensitive organic layer 112, and for example, the light source 121 may be a laser that emits light having wavelength of approximately 200 to 400 nm, but is not limited thereto.

The digital micro mirror 122 includes a plurality of micro mirrors which sends the incident light at a desired angle. Each of the plurality of micro mirrors is configured to adjust the angle to reflect the light from the light source 121 to a specific point of the main body 110. More particularly, the digital micro mirror 122 reflects the light from the light source 121 to the photosensitive organic layer 112 of the main body 110. By using the digital micro mirror 122, the light is incident on only a part of the photosensitive organic layer 112 or the light is incident on the entirety of the photosensitive organic layer 112 by using the digital micro mirror 122, which is beneficial to deform the photosensitive organic layer 112 to various forms.

The polarizer 123 is a linear polarizer that linearly polarizes the light. The light reflected by the digital micro mirror 122 may be irradiated to the main body 110 via the polarizer 123. The photosensitive organic layer 112 of the main body 110 may be included in a specific wavelength band and deformed in reaction to a light linearly polarized in a specific direction. Therefore, the polarizer 123 is disposed between the digital micro mirror 122 and the main body 110 to provide the linearly polarized light to the main body 110 and the photosensitive organic layer 112 may be deformed by reacting to the linearly polarized light. More specifically, the polarizer 123 is disposed between the digital micro mirror 122 and the substrate 111 so that the light reflected by the digital micro mirror 122 is linearly polarized and incident on the photosensitive organic layer 112. Since the photosensitive organic layer 112 may be expanded in a direction parallel to a polarization direction of the linearly polarized light, a polarization axis of the polarizer 123 may be designed by considering an expansion direction of the photosensitive organic layer 112, and this will be described below in more detail with reference to FIG. 3.

Meanwhile, in FIG. 1, it is illustrated that the light irradiation unit 120 includes one polarizer 123, but the light irradiation unit 120 may also include a plurality of polarizers 123 by considering the number of photosensitive organic layers 112 and a deformation direction of the photosensitive organic layer 112, and the present disclosure is not limited thereto.

The control unit 130 is a component that controls and drives the light irradiation unit 120 and the main body 110. The control unit 130 includes a light irradiation control unit or circuit or light irradiation controller 131 connected to the light irradiation unit 120, and an analysis unit or circuit 132 and a power supply unit or circuit or assembly 133 connected to the main body 110.

The light irradiation control unit 131 is connected to the light irradiation unit 120 to control the light irradiation unit 120. For example, the light irradiation control unit 131 is connected to the digital micro mirror 122 and controls the angle of each of the plurality of micro mirrors to control a direction, an intensity, etc., of the light incident on the main body 110.

The analysis unit 132 analyzes the base sequence of the DNA by detecting the electrical current change of the main body 110. The analysis unit 132 is electrically connected to a pair of sensing electrodes SE of the main body 110 to detect the change of a current which flows on the pair of sensing electrodes SE when the DNA passes through the nano gap G (or "nanogap G" or "nano-gap G") between the pair of sensing electrodes SE. The nano gap G between the pair of sensing electrodes SE has a size corresponding to the DNA, and the analysis unit 132 may detect a current which flows on a pair of sensing electrodes SE and the DNA when the DNA passes between a pair of sensing electrodes SE. Therefore, the analysis unit 132 may analyze the base sequence of the DNA based on the current varying according to a molecular structure of each base while the DNA passes through the nano gap G. It should be understood that the nano gap G may have at least one dimension that is in a nanoscale range. For example, the nanoscale range may be less than 1000 nanometers (nm), less than 100 nm or less than 10 nm.

The power supply unit 133 applies a voltage to the pair of sensing electrodes SE. The power supply unit 133 applies the voltage to the pair of sensing electrodes SE to drive the main body 110. In some embodiments, the power supply unit 133 may also be designed as a separate component from the control unit 130, and the present disclosure is not limited thereto.

Hereinafter, the main body 110 of the DNA analysis device 100 according to an example embodiment of the present disclosure will be described in more detail with reference to FIGS. 2A to 4.

Figure 2A:
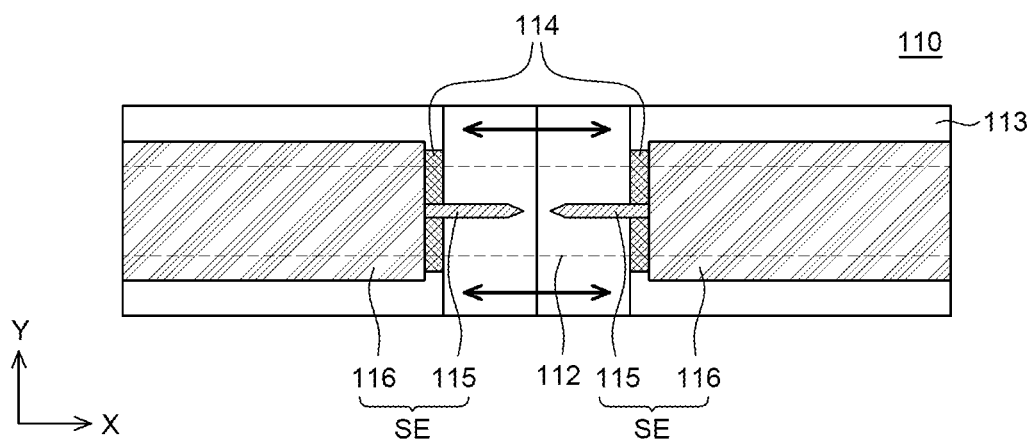
FIG. 2A is a plan view of a main body of the DNA analysis device according to an example embodiment of the present disclosure.
Figure 2B:
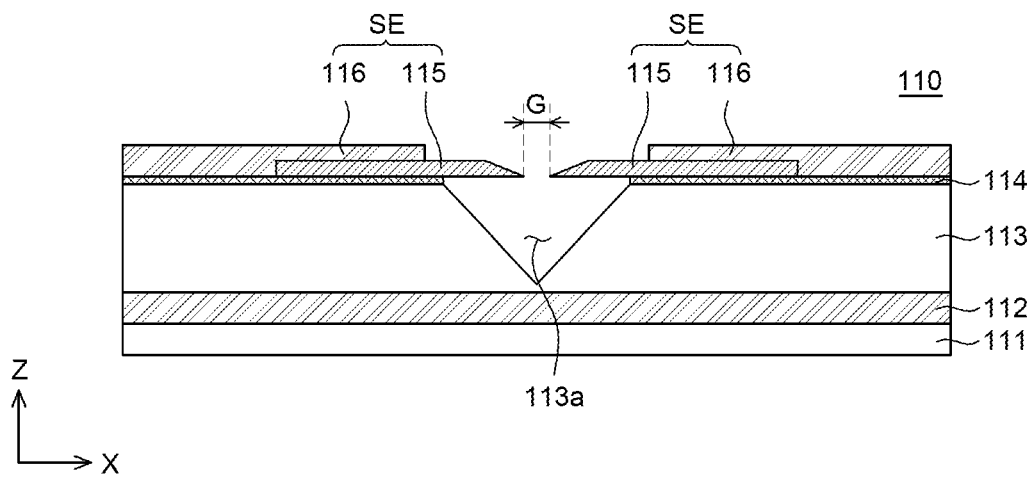
FIGS. 2B and 2C are cross-sectional views of the main body of the DNA analysis device according to an example embodiment of the present disclosure.
Figure 2C:
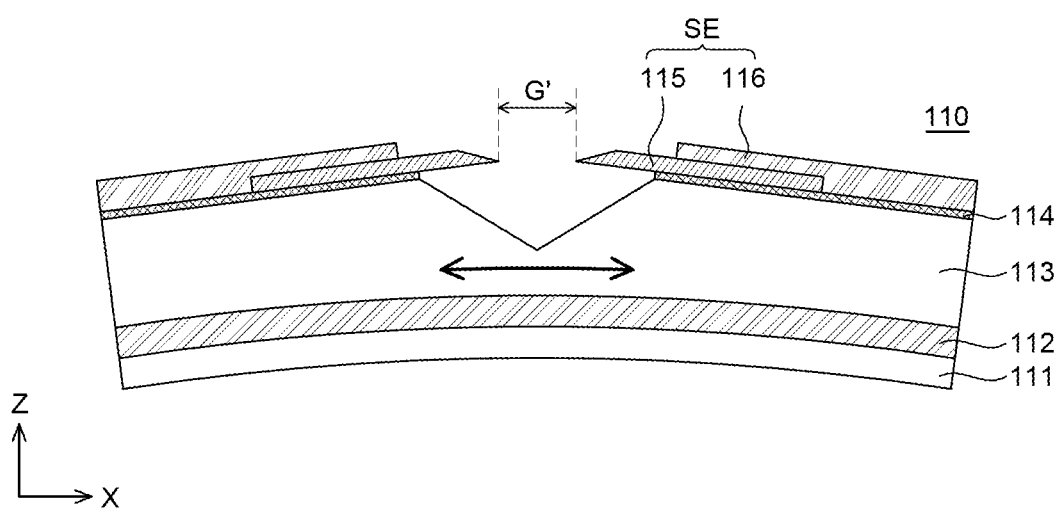
Figure 3:
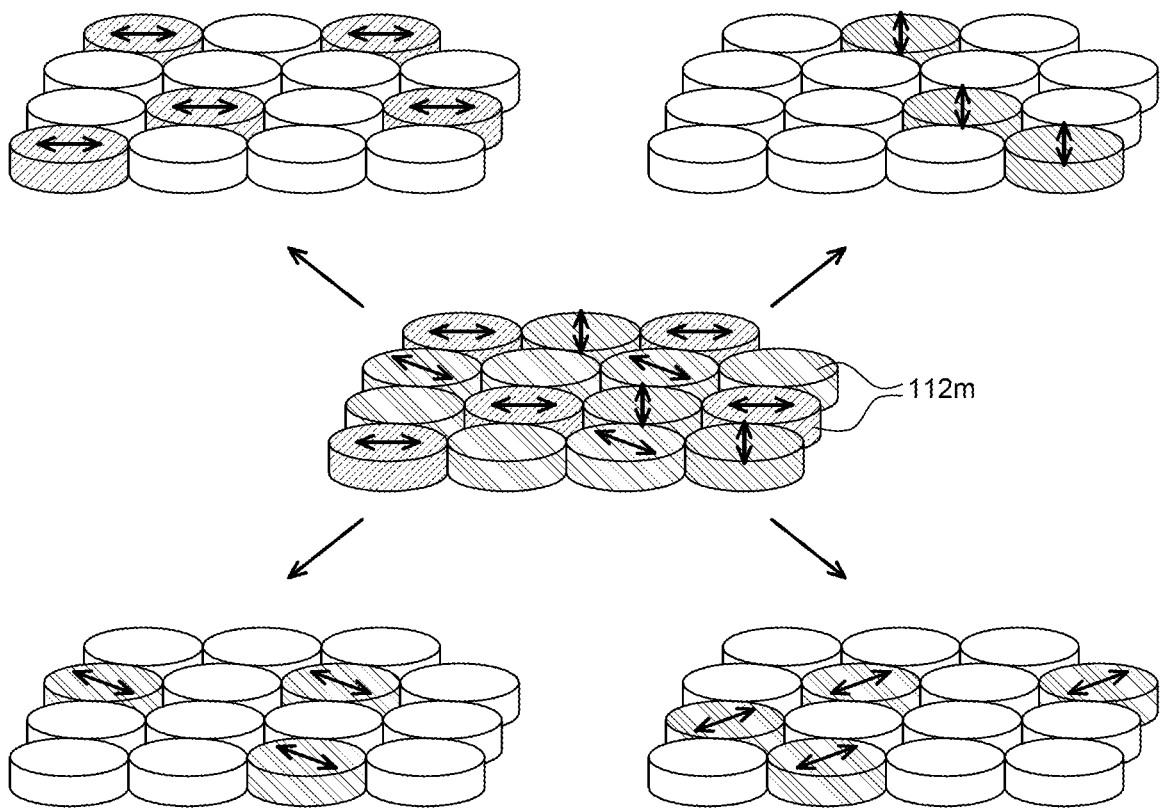
FIG. 3 is a diagram for describing a photosensitive organic layer of the DNA analysis device according to an example embodiment of the present disclosure.
Figure 4:
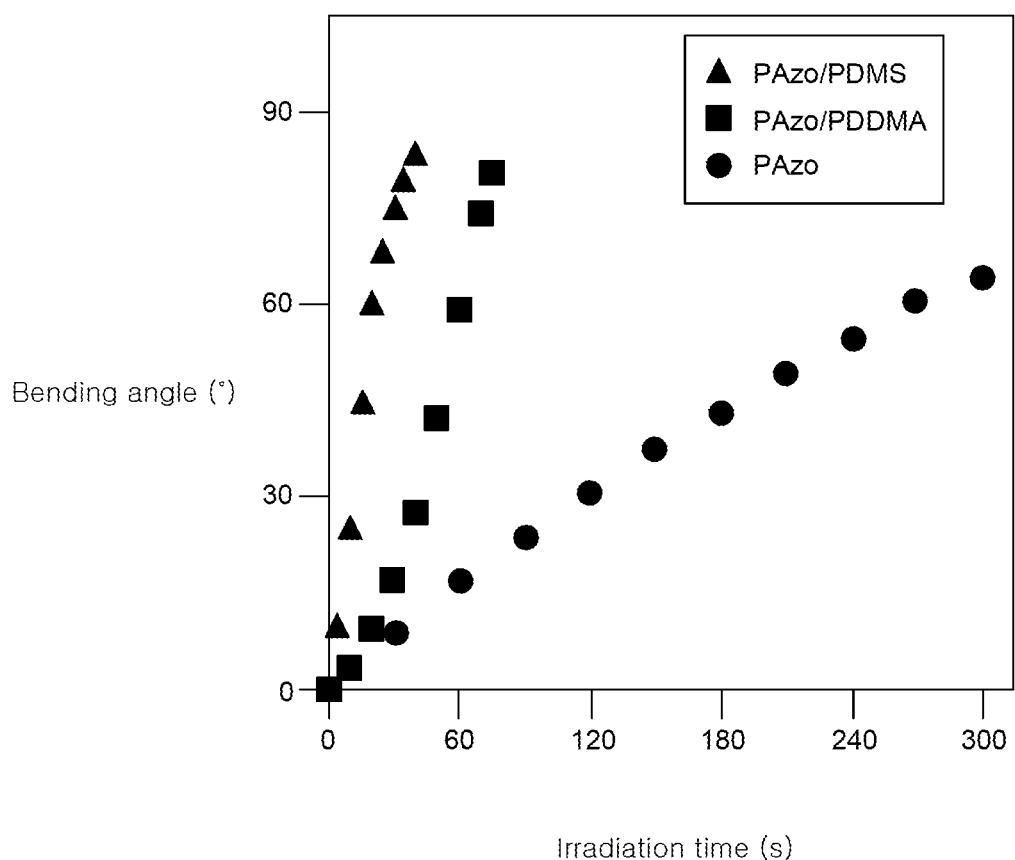
FIG. 4 is a graph for describing a bending angle depending on a light irradiation time of the photosensitive organic layer of the DNA analysis device according to an example embodiment of the present disclosure.

FIG. 2A is a plan view of a main body of the DNA analysis device according to an example embodiment of the present disclosure. FIGS. 2B and 2C are cross-sectional views of the main body of the DNA analysis device according to an example embodiment of the present disclosure. FIG. 3 is a diagram for describing a photosensitive organic layer of the DNA analysis device according to an example embodiment of the present disclosure. FIG. 4 is a graph for describing a bending angle depending on a light irradiation time of the photosensitive organic layer of the DNA analysis device according to an example embodiment of the present disclosure.

Referring to both FIGS. 2A and 2B, the main body 110 includes a substrate 111, the photosensitive organic layer 112, an insulating layer 113, a metallic pattern 114, and a pair of sensing electrodes SE.

The substrate 111 is a substrate 111 for supporting and protecting other components of the main body 110. The substrate 111 as a transparent flexible substrate 111 may be made of an insulating material which may be bent or extended. The substrate 111 may be made of a transparent material so that the light from the light irradiation unit 120 may be incident on the photosensitive organic layer 112, and made of a material having flexibility to be deformed with the deformation of the photosensitive organic layer 112. For example, the substrate 111 may be made of silicone rubber such as polydimethylsiloxane (PDMS), elastomer such as polyurethane (PU), polytetrafluoroethylene (PTFE), etc., but the present disclosure is not limited thereto.

The photosensitive organic layer 112 may be deformed by reacting to the light irradiated from the light irradiation unit 120. The photosensitive organic layer 112 may be expanded or contracted according to a wavelength of the irradiated light. For example, when the light irradiation unit 120 irradiates a light of a UV region to the photosensitive organic layer 112, the photosensitive organic layer 112 may be expanded by reacting to the light of the UV region. When the light irradiation unit 120 does not irradiate the light and the photosensitive organic layer 112 is thus exposed to a light of a visible-ray area, the photosensitive organic layer 112 is contracted to return to an original state thereof again. The visible-ray area or spectrum of visible light may correspond to wavelengths in a range of about 380 nm to about 750 nm. The UV region may correspond to wavelengths in a range of about 10 nm to about 400 nm, such as between about 100 nm and 380 nm.

Referring to FIG. 3, the photosensitive organic layer 112 may be configured by mixing a polymer constituting or including an organic matrix with a photosensitive material 112m. As described above, the photosensitive material 112m is a material which reacts to a specific wavelength, and for example, crosslinked liquid-crystalline polymers (CLCPs) including azobenzene series, block copolymer particles (BCPs) including nitrobenzyl esters series and coumarin esters series, or the like may be used, and CLCPs and BCPs series materials may also be mixed and used for reactivity adjustment and improvement of the photosensitive organic layer 112 according to the wavelength of the light.

Referring to both FIGS. 2C and 3, the photosensitive organic layer 112 may be expanded and contracted in the polarization direction of the linearly polarized light. The photosensitive organic layer 112 may be expanded in a direction parallel to the polarization direction of the light. The photosensitive organic layer 112 may include the photosensitive material 112m which reacts to the light linearly polarized in a specific or selected direction, and may be expanded and contracted in the specific or selected direction. For example, when a light which is linearly polarized at 0 degrees is irradiated to the photosensitive organic layer 112, the photosensitive organic layer 112 may be expanded in an X-axis direction by some photosensitive materials 112m which react to the 0-degree linearly polarized light as in a top left end of FIG. 3. Similarly, when a light which is linearly polarized at 90 degrees is irradiated to the photosensitive organic layer 112, the photosensitive organic layer 112 may be expanded in a Y-axis direction by some photosensitive materials 112m which react to the 90-degree linearly polarized light as in a top right end of FIG. 3. Further, when a light which is linearly polarized at 135 degrees is irradiated to the photosensitive organic layer 112, the photosensitive organic layer 112 may be expanded in a diagonal direction by some photosensitive materials 112m which react to the 135-degree linearly polarized light as in a bottom left end of FIG. 3, and when a light which is linearly polarized at 45 degrees is irradiated to the photosensitive organic layer 112, the photosensitive organic layer 112 may be expanded in the diagonal direction by some photosensitive materials 112m which react to the 45-degree linearly polarized light as in a bottom right end of FIG. 3.

Therefore, when the photosensitive organic layer 112 is constituted by or includes a plurality of photosensitive materials 112m which is randomly aligned or aligned according to a selected pattern, the light linearly polarized in the specific direction is irradiated to the photosensitive organic layer 112 to deform the photosensitive organic layer 112 only in the specific or selected direction. Further, the photosensitive materials 112m of the photosensitive organic layer 112 are aligned only in the specific or selected direction through rubbing or light alignment to fix an expansion direction of the photosensitive organic layer 112 to the specific or selected direction. For example, the plurality of photosensitive materials 112m constituting the photosensitive organic layer 112 may be aligned in the direction parallel to the polarization direction.

A solid content ratio of the photosensitive material 112m constituting or included in the photosensitive organic layer 112 may be designed by considering a reaction speed of the photosensitive organic layer 112. When the content ratio of the photosensitive material 112m is smaller, the reaction speed of the photosensitive organic layer 112 may decrease, and on the contrary, when the content ratio is the higher, the reaction speed of the photosensitive organic layer 112 may increase. For example, the solid content ratio of the photosensitive material 112m may be approximately 20% to 35%. Therefore, an approximate amount of photosensitive material 112m may be mixed with the organic matrix polymer in a manner beneficial to select the reaction speed of the photosensitive organic layer 112.

Meanwhile, the reactivity of the photosensitive organic layer 112 may vary depending on the thickness of the photosensitive organic layer 112. For example, as the thickness of the photosensitive organic layer 112 increases, the reactivity of the photosensitive organic layer 112 increases, so the photosensitive organic layer 112 may be more deformed. However, when the thickness of the photosensitive organic layer 112 exceeds a predetermined or selected numerical value, e.g., approximately 18 μm, the reactivity reaches a saturation state, so a deformation level of the photosensitive organic layer 112 has a limitation. Therefore, by considering this, the thickness of the photosensitive organic layer 112 may be selected. For example, selecting a thickness of less than about 18 μm for the photosensitive organic layer 112 may be beneficial to reduce overall thickness of the main body 110.

In addition, referring to FIG. 4 jointly, the reactivity of the photosensitive organic layer 112 may vary depending on a material type and a light irradiation time. When a light having the same intensity is irradiated to the photosensitive organic layer 112 for the same time, the reactivity may vary depending on the type of photosensitive material 112m. For example, a photosensitive organic layer 112 made of PAzo/PDMS has a largest reactivity, so the photosensitive organic layer 112 may be bent at up to approximately 90 degrees, and a photosensitive organic layer 112 made of only PAzo has a low reactivity, so the photosensitive organic layer 112 may be bent at up to approximately 60 degrees.

Further, as a time for which the light is irradiated to the photosensitive organic layer 112 increases, the reactivity of the photosensitive organic layer 112 may increase. For example, in the case of all of three photosensitive organic layers 112 made of PAzo/PDMS, PAzo/PDDMA, and PAzo, respectively, it may be confirmed that with increased time of irradiating the light, the bending angle gradually increases.

Therefore, the reactivity and the reaction speed of the photosensitive organic layer 112 may be determined or selected based on the type of the photosensitive material 112m constituting or included in the photosensitive organic layer 112, the content ratio of the photosensitive material 112m, the thickness of the photosensitive organic layer 112, the intensity of the light, and the irradiation time of the light.

Referring back to FIGS. 2A and 2B, the insulating layer 113 is disposed on the photosensitive organic layer 112. The insulating layer 113 may protect the photosensitive organic layer 112 so as to prevent the photosensitive organic layer 112 from being exposed to the outside. The insulating layer 113 may be disposed to cover the photosensitive organic layer 112 made of an organic material, and may protect the photosensitive organic layer 112 from being deformed by external moisture or oxygen. In this case, a depth of a groove 113a of the insulating layer 113 may be determined within a range in which the photosensitive organic layer 112 is not exposed from the insulating layer 113. Further, the insulating layer 113 may insulate the photosensitive organic layer 112 from other components of the main body 110. The insulating layer 113 may be made of the material having the flexibility so as to be bent with the deformation of the photosensitive organic layer 112. For example, the insulating layer 113 and the substrate 111 may be made of or include the same material, and made of silicone rubber such as polydimethylsiloxane (PDMS), elastomer such as polyurethane (PU), polytetrafluoroethylene (PTFE), etc., but the present disclosure is not limited thereto.

The insulating layer 113 includes a groove 113a disposed to overlap with the nano gap G between a pair of sensing electrodes SE. The groove 113a may be disposed to correspond to the nano gap G between a pair of sensing electrodes SE. When the photosensitive organic layer 112 is expanded, a stress may be concentrated more on the insulating layer 113 which is discontinuously formed than on the substrate 114 which is continuously formed, and the insulating layer 113 may be more easily stretched than the substrate 111. Therefore, when the photosensitive organic layer 112 is expanded, the main body 110 may be bent so that the insulating layer 113 with the groove 113a is extended and the substrate 111 is contracted. That is, as illustrated in FIG. 2C, as the photosensitive organic layer 112 is expanded, the substrate 111, the photosensitive organic layer 112, and the insulating layer 113 may be bent to be convex upward around the groove 113a, and the nano gap G may also be changed. Therefore, the groove 113a for concentrating the stress on the insulating layer 113 may be formed in a manner beneficial so that the substrate 111, the photosensitive organic layer 112, and the insulating layer 113 are deformed in a specific or selected direction, i.e., in a direction to be convex upward. For example, the groove 113a may have the cross-sectional profile depicted in FIGS. 2B and 2C, in which sidewalls of the groove 113a are tapered linearly toward the substrate 111. In some embodiments, the groove 113a may have different shape than that depicted in FIGS. 2B and 2C. For example, the groove 113a may have one or more curved sidewalls. The groove 113a may terminate in a point in the cross-sectional profile.

The metallic pattern 114 is disposed on the insulating layer 113. A pair of metallic patterns 114 may be disposed on the insulating layer 113 with the groove 113a of the insulating layer 113 interposed therebetween. In some embodiments, each of the pair of metallic patterns 114 has a sidewall that terminates at the groove 113a. The metallic pattern 114 as an electrode used in a forming process of a tip electrode 115 configured by a nanowire (or "nano wire") of a pair of sensing electrodes SE will be described below with reference to FIG. 5B.

A pair of sensing electrodes SE spaced apart from each other with the nano gap G are disposed on the metallic pattern 114. A part of the sensing electrode SE may be disposed on the metallic pattern 114, and the remaining part may overlap with the groove 113a. Therefore, the nano gap G of a pair of sensing electrodes SE may be disposed to correspond to the groove 113a. Each of a pair of sensing electrodes SE includes the tip electrode 115 disposed on the metallic pattern 114 and a connection electrode 116 disposed on the tip electrode 115.

The tip electrode 115 is an electrode configured by the nano wire and forming the nano gap G. A pair of tip electrodes 115 may be disposed spaced apart from each other with the nano gap G. Each of a pair of tip electrodes 115 may be disposed so that a part overlaps with the groove 113a of the insulating layer 113, and the remaining part overlaps with the metallic pattern 114.

The connection electrode 116 is disposed on the tip electrode 115. A pair of connection electrodes 116 may be disposed to correspond to a pair of tip electrodes 115. Each of a pair of connection electrodes 116 may be disposed to be spaced apart from the groove 113a of the insulating layer 113, and to cover the tip electrode 115. A pair of connection electrodes 116 may electrically connect the control unit 130 and the tip electrode 115. Therefore, the voltage may be applied to a pair of connection electrodes 116 from the control unit 130, and the control unit 130 may detect the current which flows on the tip electrode 115 when the DNA passes through the nano gap G through the connection electrode 116.

Meanwhile, the nano gap G may have an interval corresponding to the DNA so that the DNA passes through the nano gap G. When the nano gap G is excessively small, the DNA base sequence may not be analyzed, and when the nano gap G is excessively large, DNA strands may pass through the nano gap G in a clumping state, so accurate base sequence analysis may be difficult. Therefore, in the DNA analysis device 100 according to an example embodiment of the present disclosure, the linearly polarized light is irradiated to the photosensitive organic layer 112 of the main body 110 to simply adjust the nano gap G.

Referring to FIGS. 2A and 2C, the DNA analysis device 100 deforms the photosensitive organic layer 112 to adjust the nano gap G. When the photosensitive organic layer 112 is deformed, the nano gap G between the pair of sensing electrodes SE is varied. First, the light irradiation unit 120 irradiates the linearly polarized light to the photosensitive organic layer 112 of the main body 110 to deform the main body 110. For example, the light is irradiated to the photosensitive organic layer 112 to bend the main body 110 to be convex upward.

The photosensitive organic layer 112 is controlled to be expanded in a longitudinal direction of a pair of sensing electrodes SE, i.e., the X-axis direction to bend the main body 110 to be convex upward. In this case, the light linearly polarized in the X-axis direction is irradiated to the main body 110 to expand the photosensitive organic layer 112 in the X-axis direction. The photosensitive organic layer 112 may be expanded in the longitudinal direction of a pair of sensing electrodes SE by reacting to the linearly polarized light, and the substrate 111, the photosensitive organic layer 112, and the insulating layer 113 may be bent to be convex toward of the top of the substrate 111 around the groove 113a on which the stress is concentrated. Therefore, as the main body 110 is bent around the groove 113a, a nano gap G' between a pair of sensing electrodes SE may increase. In this case, by adjusting the intensity and the irradiation time of the light, the bending angle and the nano gap G of the main body 110 may be precisely controlled. The nano gap G may be referred to as a first nano gap G and the nano gap G' may be referred to as a second nano gap G'. The second nano gap G' may have at least one dimension (e.g., along the X-axis direction) that exceeds that of the first nano gap G.

Meanwhile, the nano gap G between a pair of sensing electrodes SE has a very small size, and in order to form the nano gap G, semiconductor equipment that is capable of performing a micro process is beneficial. However, when forming a nanoscale nano gap, there is a problem in that it is difficult to implement the nano gap G designed due to a process error, etc.

Therefore, in the DNA analysis device 100 according to an example embodiment of the present disclosure, the photosensitive organic layer 112 is formed in the main body 110 to easily adjust the nano gap G. The photosensitive organic layer 112 is a layer that has a property of being expanded and contracted by the light, and the photosensitive organic layer 112 is deformed to bend the main body 110. When the photosensitive organic layer 112 is expanded, and the main body 110 is thus bent around the groove 113a, the size of the nano gap G of the sensing electrode SE positioned on the groove 113a may be changed. Therefore, the photosensitive organic layer 112 is deformed to control the nano gap G between a pair of sensing electrodes SE to a desired or selected size. For example, when the light linearly polarized in the longitudinal direction of the sensing electrode SE is irradiated to the main body 110 to expand the photosensitive organic layer 112 in the longitudinal direction of the sensing electrode SE, the insulating layer 113 and the substrate 111 surrounding the photosensitive organic layer 112 may be deformed. The insulating layer 113 and the substrate 111 may be bent around the groove 113a on which the stress is concentrated by the expansion of the photosensitive organic layer 112, and the main body 110 may be bent and the size of the nano gap G between a pair of sensing electrodes SE may increase. On the contrary, when the light is not irradiated to the main body 110 or is irradiated more weakly to the main body 110, and the photosensitive organic layer 112 is contracted to the original state or a less deformed state, the insulating layer 113 and the substrate 111 may return to a flat state or a less curved state from the bending state, and the size of the nano gap G may decrease. Accordingly, in the DNA analysis device 100 according to an example embodiment of the present disclosure, the nano gap G between a pair of sensing electrodes SE may be simply adjusted by just irradiating the light without the semiconductor equipment which is expensive.

Hereinafter, a manufacturing method of the DNA analysis device 100 according to an example embodiment of the present disclosure will be described with reference to FIGS. 5A to 5D.

FIGS. 5A to 5D are process diagrams for describing a manufacturing method of a DNA analysis device according to an example embodiment of the present disclosure.

Figure 5A:
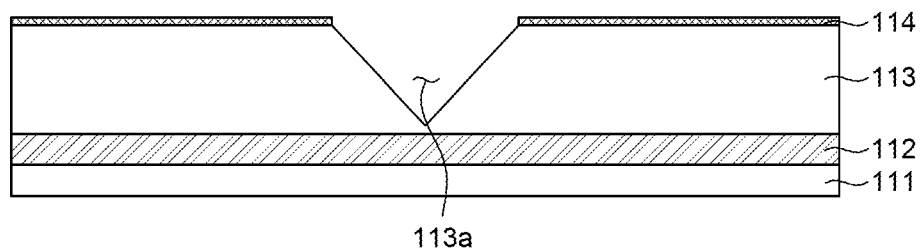
FIGS. 5A to 5D are process diagrams for describing a manufacturing method of a DNA analysis device according to an example embodiment of the present disclosure.

Referring to FIG. 5A, on the substrate 111, the photosensitive organic layer 112 is formed, and the insulating layer 113 covering the photosensitive organic layer 112 is formed. Subsequently, a metallic layer for forming the metallic pattern 114 is formed on the insulating layer 113. In addition, the metallic pattern 114 and the insulating layer 113 are partially etched to form the groove 113a. The groove 113a may be formed on the insulating layer 113 to correspond to the nano gap G.

Figure 5B:
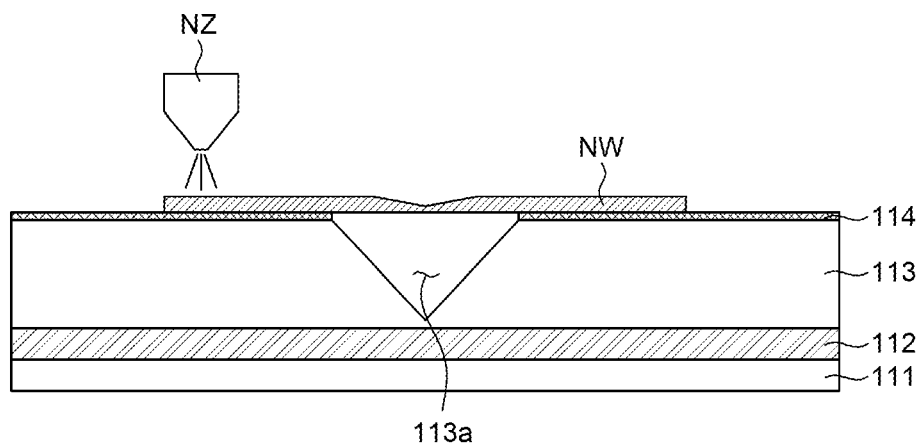

Referring to FIG. 5B, a nano wire layer NW constituting or included in the tip electrode 115 is formed by using an electro-hydro-dynamic (EHD) printing scheme. The tip electrode 115 constituted by or including nano wires may be formed by an electrical radiation scheme. A solution in which the nano wires are distributed may be applied onto the metallic pattern 114 by using a cone-jet in a nozzle NZ. In this case, voltages having opposite polarities are applied to the nozzle NZ and the metallic pattern 114 to smoothly form the nano wire made of a conductive material on the substrate 111. However, in FIG. 5B, it is described that the nano wire layer NW for forming the tip electrode 115 is formed by the EHD printing scheme, but the nano wire layer NW and the tip electrode 115 may be formed by other schemes other than the EHD printing scheme, and the metallic pattern 114 may be omitted depending on the scheme, and the present disclosure is not limited thereto.

Figure 5C:
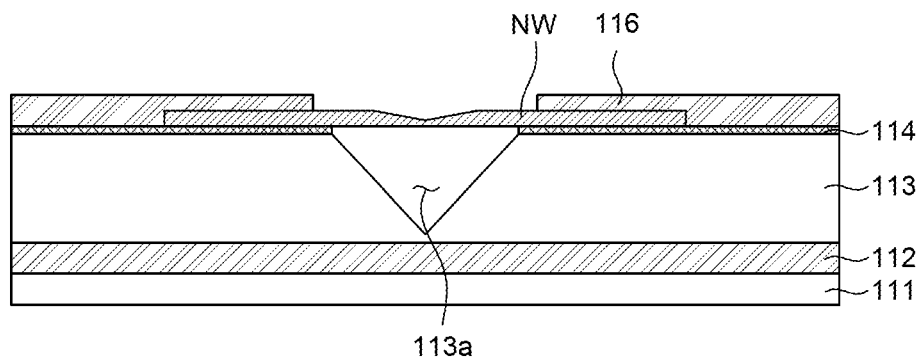

Referring to FIG. 5C, a pair of connection electrodes 116 are formed on the nano wire layer NW. The pair of connection electrodes 116 may be spaced apart from each other with the groove 113a interposed therebetween. One connection electrode 116 may cover one end of the nano wire layer NW disposed at one side of the groove 113a, and the remaining connection electrode 116 may cover the other end of the nano wire layer NW disposed at the other side of the groove 113a.

Figure 5D:
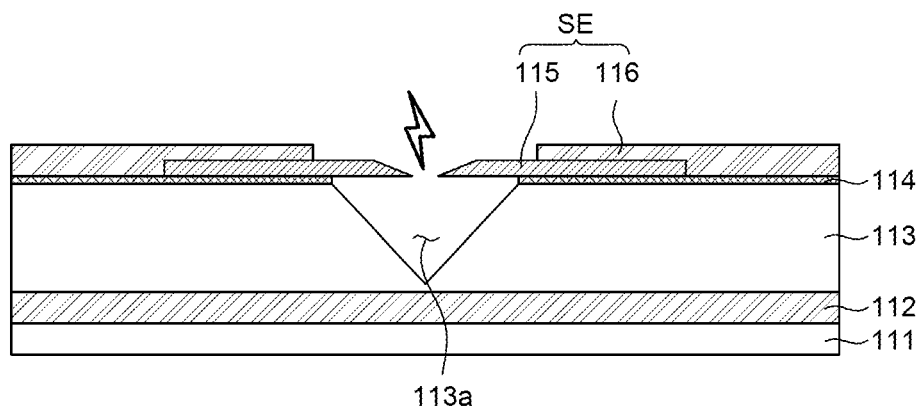

Referring to FIG. 5D, electrical current flows on the connection electrode 116 and the nano wire layer NW to separate one nano wire layer NW into a pair of tip electrodes 115. Referring to FIG. 5B, portions of the nano wire layer NW formed on the metallic pattern 114 on either side of the groove 113a are connected to each other unlike a pair of tip electrodes 115 which are spaced apart from each other. Therefore, a middle portion of the nano wire is cut to form a pair of tip electrodes 115 spaced apart from each other to form the nano gap G.

To this end, in the related art, the nano wire layer NW is intended to be patterned by using the semiconductor equipment capable of performing the micro process, but a nanoscale delicate patterning process is not easy, and it is difficult to pattern the nano wire layer NW to form a nano gap G having a specific or selected numerical value due to a process error, etc. Therefore, in the manufacturing method of the DNA analysis device 100 according to an example embodiment of the present disclosure, when the nano wire layer NW is formed, a radiation speed is adjusted, and high current flows on the nano wire layer NW to disconnect the nano wire layer NW. Specifically, when the nano wire layer NW is formed, the radiation speed is adjusted to form the middle portion of the nano wire layer NW which overlaps with the groove 113a to be formed thinner than the remaining portion. In addition, when the high current flows on the nano wire layer NW through the connection electrode 116, the thinly formed middle portion may be disconnected.

Therefore, in the manufacturing method of the DNA analysis device 100 according to an example embodiment of the present disclosure, the current is applied to the nano gap G of the nano wire to simply form the nano gap G. In order to disconnect the middle portion of the nano wire, the semiconductor equipment capable of micro processing may also be used, but the semiconductor equipment is very expensive, and is difficult to perform the process by the unit of the nano which is very small. Unlike this, in the manufacturing process of the DNA analysis device 100 according to an example embodiment of the present disclosure, when the nano wire layer NW is formed, the radiation speed is adjusted to form the middle portion of the nano wire layer NW to be disconnected relatively thinly. Thereafter, when the high current is applied to the nano wire layer NW, a middle portion which is formed thin and has a high resistance may be disconnected, and the nano wire layer NW may be separated into a pair of tip electrodes 115. Therefore, the nano wire layer NW may be easily formed into a pair of tip electrodes 115 having the nano gap G without the expensive and complicated semiconductor equipment.

The DNA analysis device 100 according to an example embodiment of the present disclosure may easily adjust the nano gap G of the nano wire even after a manufacturing process of the DNA analysis device 100 is completed. The nano gap G formed in the process of disconnecting the middle portion of the nano wire layer NW by applying the high current is formed to be different from a designed numerical value, which may lead to a defect of the DNA analysis device 100. However, the DNA analysis device 100 according to an example embodiment of the present disclosure is capable of adjusting the nano gap G by a scheme of deforming the photosensitive organic layer 112 even after the nano gap G is formed. Therefore, the nano gap G may be adjusted without a limitation to a process error upon forming the nano gap G, and the reliability of the DNA analysis device 100 may be enhanced.

Figure 6:
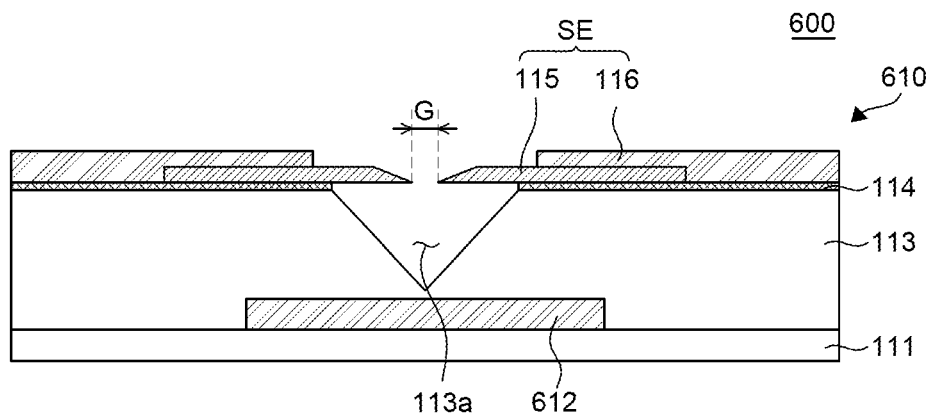
FIGS. 6 to 8 are cross-sectional views of the main body of the DNA analysis device according to various example embodiments of the present disclosure.
Figure 7:
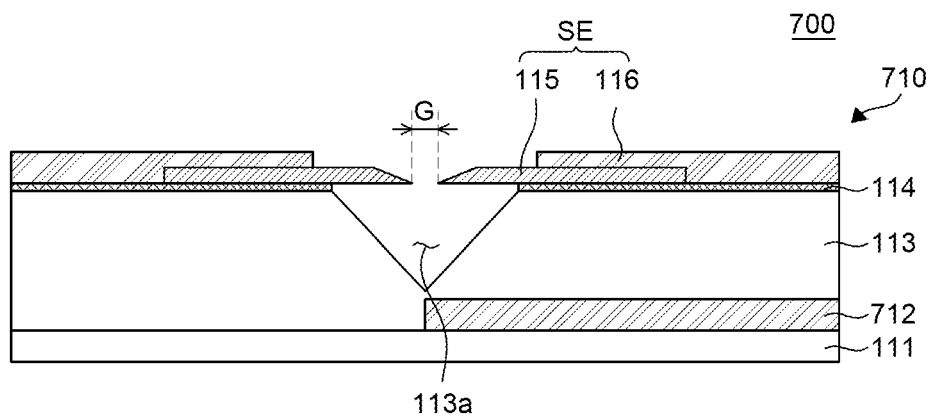
Figure 8:
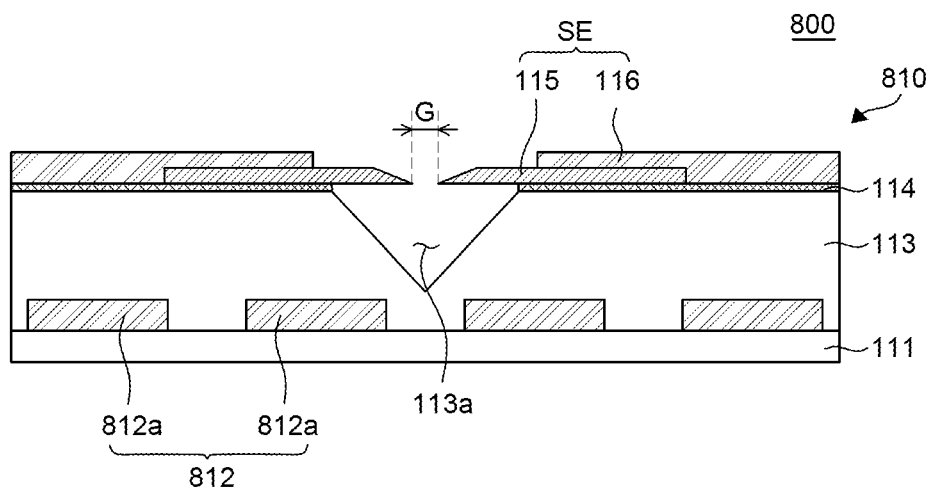

FIGS. 6, 7 and 8 are cross-sectional views of the main body of the DNA analysis device according to various example embodiments of the present disclosure. DNA analysis devices 600, 700, and 800 of respective FIGS. 6 to 8 are different from the DNA analysis device 100 in FIGS. 1 to 2C in terms of photosensitive organic layers 612, 712, and 812, and the DNA analysis devices 600, 700, and 800 are substantially the same as the DNA analysis device 100 in terms of other components, so a redundant description is omitted.

Referring to FIGS. 6 to 8, the photosensitive organic layers 612, 712, and 812 of the DNA analysis devices 600, 700, and 800 according to various example embodiments of the present disclosure may be variously designed.

First, referring to FIG. 6, in the DNA analysis device 600 according to another example embodiment of the present disclosure, the photosensitive organic layer 612 may be disposed only in a part of the substrate 111. The photosensitive organic layer 612 is not disposed in the entirety of the substrate 111, but may be disposed only at a part of the substrate 111 corresponding to the groove 113a of the insulating layer 113. Therefore, the photosensitive organic layer 612 is formed only at a part of the main body 610 instead of forming the photosensitive organic layer 612 in the entirety of the main body 610 to easily adjust the nano gap G. For example, as depicted in FIG. 6, the photosensitive organic layer 612 may not fully overlap the tip electrodes 115 and instead may partially overlap the tip electrodes 115 along the X-axis direction. The photosensitive organic layer 612 may fully overlap the groove 113a along the X-axis direction.

Referring to FIG. 7, in the DNA analysis device 700 according to yet another example embodiment of the present disclosure, the photosensitive organic layer 712 may be disposed at one side of the groove 113a, such that the photosensitive organic layer 712 is disposed adjacent to one sensing electrode of the pair of sensing electrodes SE. The photosensitive organic layer 712 may be disposed in a symmetric structure around the groove 113a or may be disposed in an asymmetric structure around the groove 113a. If the photosensitive organic layer 712 is disposed in the symmetric structure as in FIG. 6, the nano gap G may be adjusted by a scheme of adjusting locations of both of a pair of sensing electrodes SE when the photosensitive organic layer 712 is deformed. On the contrary, if the photosensitive organic layer 712 of the asymmetric structure is disposed in the main body 710, the location of only one electrode adjacent to the photosensitive organic layer 712 of a pair of sensing electrodes SE is adjusted to adjust the nano gap G when the photosensitive organic layer 712 is deformed. Therefore, the photosensitive organic layer 712 is disposed in the asymmetric structure to adjust the nano gap G. It should be understood that "adjacent" includes the meaning that one element is on the same side as another element. For example, the photosensitive organic layer 712 depicted in FIG. 7 is on the same side of the groove 113a as one of the sensing electrodes SE. Similarly, the photosensitive organic layer 712 depicted in FIG. 7 may be said to be "not adjacent" to the other sensing electrode SE on the other side of the groove 113a.

Referring to FIG. 8, in the DNA analysis device 800 according to yet another example embodiment of the present disclosure, the photosensitive organic layer 812 may be constituted by or include a plurality of sub photosensitive organic layers 812a. The plurality of sub photosensitive organic layers 812a is disposed on the substrate 111 to deform only a part of the main body 810 or deform the entirety of the main body 810. Therefore, the nano gap G may be more precisely adjusted through the plurality of sub photosensitive organic layers 812a.

Therefore, in the DNA analysis devices 600, 700, and 800 according to various example embodiments of the present disclosure, the photosensitive organic layers 612, 712, and 812 are variously designed to adjust the nano gap G. For example, referring to FIG. 6, the photosensitive organic layer 612 is partially formed only at a partial region of the main body 610 to adjust the nano gap G. In this case, since at least a part of the photosensitive organic layer 612 overlaps with the groove 113a, the stress is concentrated on the groove 113a to easily bend the main body 610 when the photosensitive organic layer 612 is deformed. Referring to FIG. 7, the photosensitive organic layer 712 is disposed in the asymmetric structure to adjust the nano gap G. In this case, as the photosensitive organic layer 712 is disposed at one side of the groove 113a, direct irradiation of the light to the groove 113a portion is minimized or reduced to minimize or reduce noise upon DNA analysis. Further, even though the photosensitive organic layer 712 is disposed in the asymmetric structure, the photosensitive organic layer 712 is disposed adjacent to the groove 113a, so the main body 710 may be easily bent. Referring to FIG. 8, a plurality of sub photosensitive organic layers 812a is disposed on the substrate 111 to deform the main body 810 in various forms. For example, the light is irradiated to only some sub photosensitive organic layers 812a among the plurality of sub photosensitive organic layers 812a to change the nano gap G relatively slightly, and the light is irradiated to all sub photosensitive organic layers 812a to change the nano gap G relatively much. Therefore, in the DNA analysis devices 600, 700, and 800 according to various example embodiments of the present disclosure, the photosensitive organic layers 612, 712, and 812 may be designed variously.

Figure 9A:
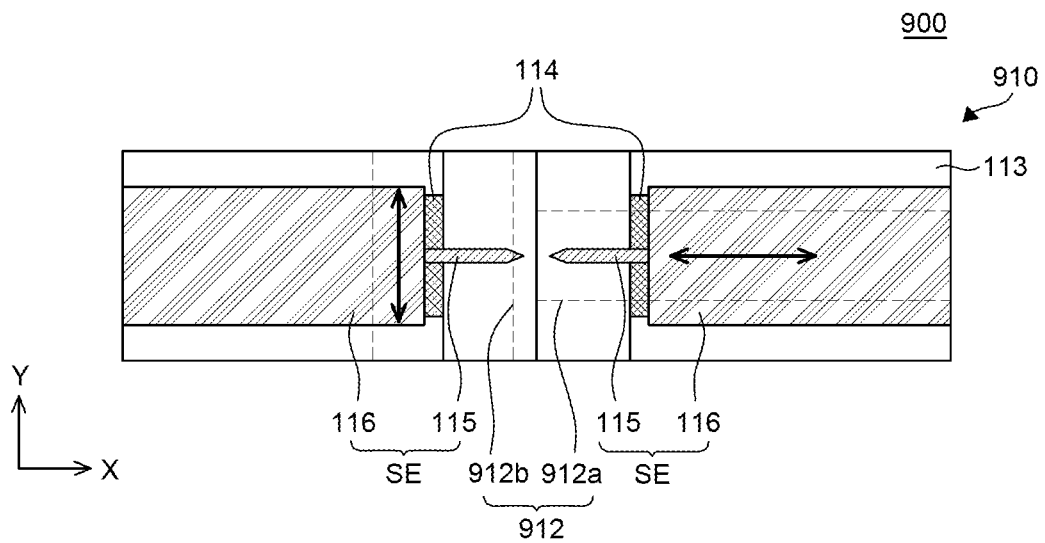
FIG. 9A is a plan view of the main body of the DNA analysis device according to another example embodiment of the present disclosure.
Figure 9B:
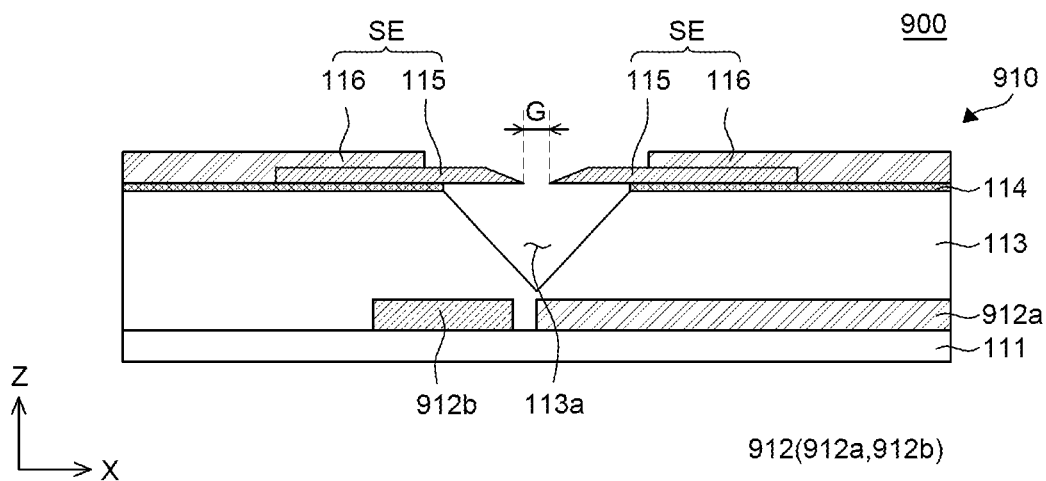
FIG. 9B is a cross-sectional view of the main body of the DNA analysis device according to yet another example embodiment of the present disclosure.

FIG. 9A is a plan view of the main body of the DNA analysis device according to another example embodiment of the present disclosure. FIG. 9B is a cross-sectional view of the main body of the DNA analysis device according to yet another example embodiment of the present disclosure. The DNA analysis device 900 of FIGS. 9A and 9B is different from the DNA analysis device 100 in FIGS. 1 to 2C only in terms of photosensitive organic layer 912, and the DNA analysis device 900 is substantially the same as the DNA analysis device 100 in terms of other components, so a redundant description is omitted.

Referring to FIGS. 9A and 9B, the photosensitive organic layer 912 includes a first photosensitive organic layer 912a and a second photosensitive organic layer 912b. The first photosensitive organic layer 912a and the second photosensitive organic layer 912b may be disposed spaced apart from each other on the substrate 111. The first photosensitive organic layer 912a may be disposed at one side of the groove 113a, and the second photosensitive organic layer 912b may be disposed at the other side of the groove 113a. For example, the first photosensitive organic layer 912a may overlap with one sensing electrode SE and the second photosensitive organic layer 912b may overlap with the remaining sensing electrode SE. As shown in FIGS. 9A and 9B, the first photosensitive organic layer 912a and the second photosensitive organic layer 912b may be disposed on the same plane (layer).

The first photosensitive organic layer 912a is deformed in the X-axis direction in order to adjust the nano gap G between the sensing electrodes SE. The first photosensitive organic layer 912a may be expanded or contracted in the X-axis direction by reacting to only the light linearly polarized in the X-axis direction. A photosensitive material 112m of the first photosensitive organic layer 912a may be aligned to react to only the light linearly polarized in the X-axis direction. Therefore, when the first photosensitive organic layer 912a is expanded, the main body 910 may be bent based on the groove 113a, and the nano gap G between a pair of sensing electrodes SE may be adjusted.

The second photosensitive organic layer 912b is deformed in the Y-axis direction in order to align a pair of tip electrodes 115 with each other. The second photosensitive organic layer 912b may be expanded or contracted in the Y-axis direction by reacting to only the light linearly polarized in the Y-axis direction. The photosensitive material 112m of the second photosensitive organic layer 912b may be aligned to react to only the light linearly polarized in the Y-axis direction. When the second photosensitive organic layer 912b is deformed, a part of the main body 910 may be bent in the Y-axis direction, and one tip electrode 115 which overlaps with the second photosensitive organic layer 912b may move in the Y-axis direction. Therefore, by moving one tip electrode 115 in the Y-axis direction by deforming the second photosensitive organic layer 912b, the locations of a pair of tip electrodes 115 may be adjusted so that a pair of tip electrodes 115 are disposed on the same line (e.g., along the X-axis direction).

Meanwhile, although not illustrated in the figure, the light irradiation unit 120 may include a polarizer 123 that provides the light linearly polarized in the X-axis direction to deform the first photosensitive organic layer 912a and a polarizer 123 that provides the light linearly polarized in the Y-axis direction to deform the second photosensitive organic layer 912b.

In the DNA analysis device 900 according to yet another example embodiment of the present disclosure, the tip electrodes 115 may be aligned with each other, and at the same time, the nano gap G may also be adjusted. First, the first photosensitive organic layer 912a deformed (e.g., expanded or contracted) in the longitudinal direction of a pair of sensing electrodes SE is disposed to adjust the nano gap G between the sensing electrodes SE. The first photosensitive organic layer 912a is deformed in the longitudinal direction of the sensing electrode SE to adjust the size of the nano gap G. However, if a pair of tip electrodes 115 are not disposed on the same line, but disposed to cross each other even though the nano gap G is adjusted, the DNA analysis may be difficult. Therefore, the second photosensitive organic layer 912b controlling the location of the tip electrode 115 may be further disposed so that a pair of tip electrodes 115 are disposed on the same line with the nano gap G. The second photosensitive organic layer 912b is deformed in a direction perpendicular to the longitudinal direction of a pair of electrodes to adjust the location of any one tip electrode 115 of a pair of tip electrodes 115. For example, the location of one tip electrode 115 may be adjusted so that one tip electrode 115 is disposed on the same line as the other tip electrode 115 by expanding one end or the other end of the second photosensitive organic layer 912b. Accordingly, the DNA analysis device 900 according to yet another example embodiment of the present disclosure includes the first photosensitive organic layer 912a controlling the nano gap G and the second photosensitive organic layer 912b aligning the tip electrode 115 to enhance DNA analysis accuracy.

Figure 10A:
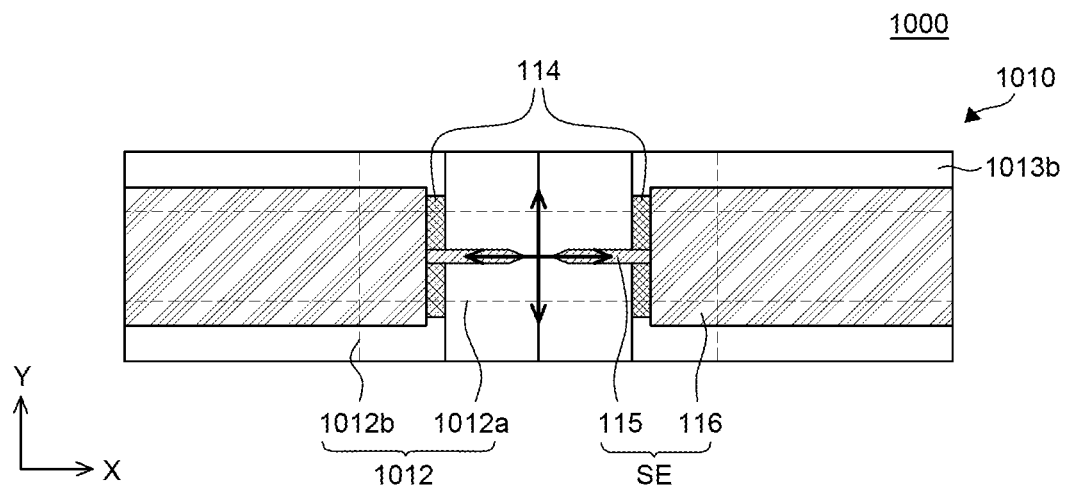
FIG. 10A is a plan view of the main body of the DNA analysis device according to yet another example embodiment of the present disclosure.
Figure 10B:
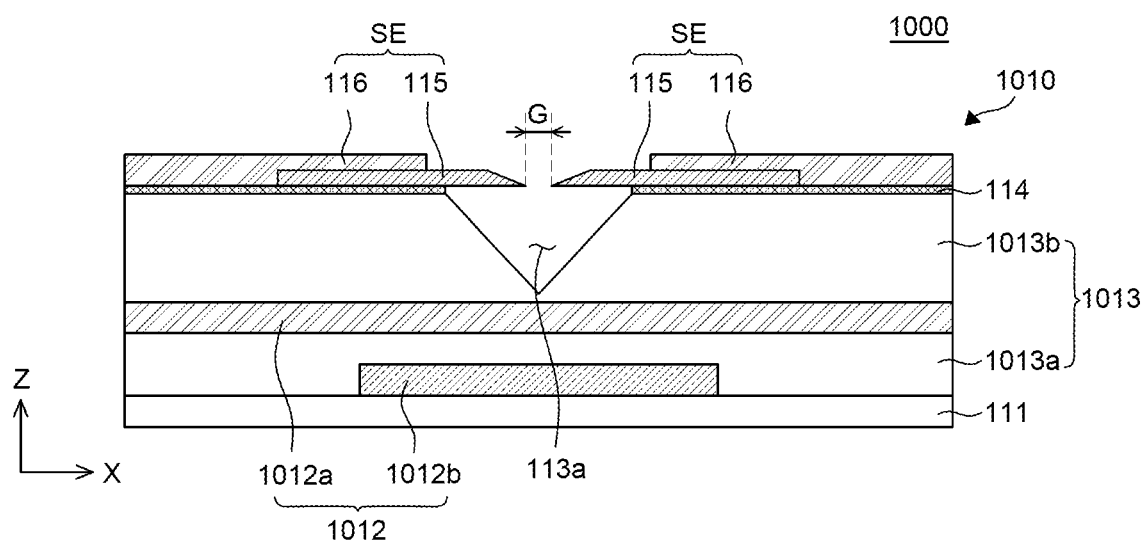
FIG. 10B is a cross-sectional view of the main body of the DNA analysis device according to yet another example embodiment of the present disclosure.

FIG. 10A is a plan view of the main body of the DNA analysis device according to yet another example embodiment of the present disclosure. FIG. 10B is a cross-sectional view of the main body of the DNA analysis device according to yet another example embodiment of the present disclosure. The DNA analysis device 1000 of FIGS. 10A and 10B is different from the DNA analysis device 900 in FIGS. 9A to 9B only in terms of an insulating layer 1013, and the DNA analysis device 1000 is substantially the same as the DNA analysis device 900 in terms of other components, so a redundant description is omitted.

Referring to FIGS. 10A and 10B, the photosensitive organic layer 1012 includes a first photosensitive organic layer 1012a and a second photosensitive organic layer 1012b, and the insulating layer 1013 includes a first insulating layer 1013a and a second insulating layer 1013b. The first photosensitive organic layer 1012a and the second photosensitive organic layer 1012b may be disposed on different layers. The first photosensitive organic layer 1012a and the second photosensitive organic layer 1012b may be disposed with the insulating layer 1013 interposed therebetween.

Specifically, the second photosensitive organic layer 1012b may be disposed on the substrate 111, and the first insulating layer 1013a may be disposed on the second photosensitive organic layer 1012b. The second photosensitive organic layer 1012b may be disposed to overlap with the groove 113a.

In addition, the first photosensitive organic layer 1012a may be disposed on the first insulating layer 1013a, and the second insulating layer 1013b may be disposed on the first photosensitive organic layer 1012a. The first photosensitive organic layer 1012a may be disposed to overlap with the groove 113a.

In this case, both the first photosensitive organic layer 1012a and the second photosensitive organic layer 1012b may overlap with the groove 113a. In this case, even though the linearly polarized light is irradiated to the groove 113a, the first photosensitive organic layer 1012a and the second photosensitive organic layer 1012b may be independently deformed according to the polarization direction. For example, when the light linearly polarized in the X-axis direction is irradiated to the groove 113a of the main body 1010, only the first photosensitive organic layer 1012a may be deformed by reacting to the linearly polarized light, and the second photosensitive organic layer 1012b may maintain the existing state. For example, when the light linearly polarized in the Y-axis direction is irradiated to the groove 113a of the main body 1010, only the second photosensitive organic layer 1012b may be deformed by reacting to the linearly polarized light, and the first photosensitive organic layer 1012a may maintain the existing state. For example, when both the light linearly polarized in the X-axis direction and the light linearly polarized in the Y-axis direction are irradiated simultaneously to the groove 113a of the main body 1010, both the first photosensitive organic layer 1012a and the second photosensitive organic layer 1012b may be deformed by reacting the light.

Accordingly, in the DNA analysis device 1000 according to yet another example embodiment of the present disclosure, the first photosensitive organic layer 1012a and the second photosensitive organic layer 1012b may be designed in various forms. The first photosensitive organic layer 1012a controlling the nano gap G and the second photosensitive organic layer 1012b aligning the tip electrode 115 may be deformed by reacting to only lights linearly polarized in different directions. For example, the first photosensitive organic layer 1012a may be deformed by reacting to the light linearly polarized in the X-axis direction and the second photosensitive organic layer 1012b may be deformed by reacting to the light linearly polarized in the Y-axis direction. Therefore, even though the first photosensitive organic layer 1012a and the second photosensitive organic layer 1012b are disposed to overlap with each other, and the light linearly polarized in the X-axis direction or the Y-axis direction is irradiated to the overlapped portion, only any one of the first photosensitive organic layer 1012a and the second photosensitive organic layer 1012b may be deformed. Accordingly, in the DNA analysis device 1000 according to yet another example embodiment of the present disclosure, the first photosensitive organic layer 1012a and the second photosensitive organic layer 1012b may be designed in various forms based on a point where the first photosensitive organic layer 1012a and the second photosensitive organic layer 1012b operate independently.

It should be understood that the embodiment of FIGS. 9A and 9B may be combined with the embodiment of FIGS. 10A and 10B. For example, the second photosensitive organic layer 912b may be disposed in a layer (or at a level) between the first photosensitive organic layer 912a and the groove 113a, similar to what is depicted in FIGS. 10A and 10B, while not overlapping each other in the Z-axis direction, which is different than what is depicted in FIGS. 10A and 10B.

The example embodiments of the present disclosure can also be described as follows:

According to an aspect of the present disclosure, there is provided a DNA analysis device. The DNA analysis device includes a substrate, a photosensitive organic layer configured to be disposed on the substrate, and expanded or contracted by reacting to light, a pair of sensing electrodes disposed on the photosensitive organic layer, and spaced apart from each other with a nano gap, and a light irradiation unit configured to irradiate the light to the photosensitive organic layer, when the photosensitive organic layer is deformed, the nano gap between the pair of sensing electrodes is varied.

Each of the pair of sensing electrodes may include a tip electrode disposed on the photosensitive organic layer, and constituted by a nano wire, and a connection electrode disposed on the tip electrode, and the DNA analysis device may further include a metallic pattern disposed between the photosensitive organic layer and the tip electrode.

The DNA analysis device may further include a control unit configured to control the pair of sensing electrodes and the light irradiation unit.

The control unit may include an analysis unit detecting a change of a current which flows on the pair of sensing electrodes when the DNA passes through the nano gap, a power supply unit applying a voltage to the pair of sensing electrodes, and a light irradiation control unit connected to the light irradiation unit.

The light irradiation unit may include a light source configured to provide the light, a digital micro mirror reflecting the light from the light source to the photosensitive organic layer, and a polarizer disposed between the digital micro mirror and the substrate, and the light may be linearly polarized by the polarizer and incident on the photosensitive organic layer.

The photosensitive organic layer may be configured to be expanded or contracted in a direction parallel to a polarization direction of light transmitting the polarizer.

The photosensitive organic layer may include a plurality of photosensitive materials, and the plurality of photosensitive materials may be aligned in the direction parallel to the polarization direction.

The DNA analysis device may further include an insulating layer disposed between the photosensitive organic layer and the pair of sensing electrodes, the insulating layer may include a groove disposed to overlap with the nano gap between the pair of sensing electrodes, and when the light is irradiated to the photosensitive organic layer, the substrate, the photosensitive organic layer, and the insulating layer may be bent around the groove and the nano gap increases.

At least a part of the photosensitive organic layer may be disposed to overlap with the groove.

The photosensitive organic layer may be disposed further adjacent to one sensing electrode of the pair of sensing electrodes.

The photosensitive organic layer may include a plurality of sub photosensitive organic layers.

The photosensitive organic layer may include a first photosensitive organic layer configured to be expanded or contracted in a longitudinal direction of the pair of sensing electrodes, and a second photosensitive organic layer configured to be expanded or contracted in a direction perpendicular to the longitudinal direction.

When light linearly polarized in the longitudinal direction is irradiated to the photosensitive organic layer, the first photosensitive organic layer may be expanded in the longitudinal direction, and the substrate, the first photosensitive organic layer, and the insulating layer are bent around the groove.

When light linearly polarized in the direction perpendicular to the longitudinal direction is irradiated to the photosensitive organic layer, the second photosensitive organic layer may be expanded in the direction perpendicular to the longitudinal direction, and a location of each of the pair of sensing electrodes is varied.

The first photosensitive organic layer and the second photosensitive organic layer may be disposed on the same plane.

The second photosensitive organic layer may be disposed on the substrate, and the first photosensitive organic layer may be disposed on the second photosensitive organic layer, and the insulating layer may include a first insulating layer disposed between the first photosensitive organic layer and the second photosensitive organic layer, and a second insulating layer disposed between the pair of sensing electrodes and the first photosensitive organic layer.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A deoxyribonucleic acid (DNA) analysis device comprising:
   a substrate;
   a photosensitive organic layer configured to be disposed on the substrate and deformed by reacting to light;
   a pair of sensing electrodes disposed on the photosensitive organic layer and spaced apart from each other by a nano gap; and
   a light irradiation unit configured to irradiate the light to the photosensitive organic layer,
   wherein:
   when the photosensitive organic layer is deformed, the nano gap between the pair of sensing electrodes is varied;
   each of the pair of sensing electrodes includes:
   a tip electrode disposed on the photosensitive organic layer, and including a nano wire, and
   a connection electrode disposed on the tip electrode; and
   the DNA analysis device further includes a metallic pattern disposed between the photosensitive organic layer and the tip electrode.

2. The DNA analysis device according to claim 1, further comprising:
   a control unit configured to control the pair of sensing electrodes and the light irradiation unit.

3. The DNA analysis device according to claim 2, wherein the control unit includes
   an analysis unit operable to detect a change of a current which flows on the pair of sensing electrodes when DNA passes through the nano gap;
   a power supply unit operable to apply a voltage to the pair of sensing electrodes; and
   a light irradiation control unit connected to the light irradiation unit.

4. The DNA analysis device according to claim 1, wherein the light irradiation unit includes:
   a light source configured to provide the light;
   a digital micro mirror operable to reflect the light from the light source to the photosensitive organic layer; and
   a polarizer disposed between the digital micro mirror and the substrate, and
   the light is linearly polarized by the polarizer and incident on the photosensitive organic layer.

5. The DNA analysis device according to claim 4, wherein the photosensitive organic layer is configured to be expanded or contracted in a direction parallel to a polarization direction of light exiting the polarizer.

6. The DNA analysis device according to claim 5, wherein the photosensitive organic layer includes a plurality of photosensitive materials, and the plurality of photosensitive materials is aligned in the direction parallel to the polarization direction.

7. The DNA analysis device according to claim 1, further comprising:
   an insulating layer disposed between the photosensitive organic layer and the pair of sensing electrodes, and
   a groove in the insulating layer disposed to overlap with the nano gap between the pair of sensing electrodes,
   wherein when the light is irradiated to the photosensitive organic layer, the substrate, the photosensitive organic layer, and the insulating layer are bent around the groove and the nano gap is varied.

8. The DNA analysis device according to claim 7, wherein at least a part of the photosensitive organic layer is disposed to overlap with the groove.

9. The DNA analysis device according to claim 7, wherein the photosensitive organic layer is disposed further adjacent to one sensing electrode of the pair of sensing electrodes.

10. The DNA analysis device according to claim 7, wherein the photosensitive organic layer includes a plurality of sub photosensitive organic layers.

11. The DNA analysis device according to claim 7, wherein the photosensitive organic layer includes:
    a first photosensitive organic layer configured to be expanded or contracted in a longitudinal direction of the pair of sensing electrodes, and
    a second photosensitive organic layer configured to be expanded or contracted in a direction perpendicular to the longitudinal direction.

12. The DNA analysis device according to claim 11, wherein when light linearly polarized in the longitudinal direction is irradiated to the photosensitive organic layer, the first photosensitive organic layer is expanded in the longitudinal direction, and the substrate, the first photosensitive organic layer, and the insulating layer are bent around the groove.

13. The DNA analysis device according to claim 11, wherein when light linearly polarized in the direction perpendicular to the longitudinal direction is irradiated to the photosensitive organic layer, the second photosensitive organic layer is expanded in the direction perpendicular to the longitudinal direction, and a location of at least one of the pair of sensing electrodes is varied.

14. The DNA analysis device according to claim 11, wherein the first photosensitive organic layer and the second photosensitive organic layer are disposed on the same plane.

15. The DNA analysis device according to claim 11, wherein
    the second photosensitive organic layer is disposed on the substrate, and the first photosensitive organic layer is disposed on the second photosensitive organic layer, and
    the insulating layer includes:
    a first insulating layer disposed between the first photosensitive organic layer and the second photosensitive organic layer, and
    a second insulating layer disposed between the pair of sensing electrodes and the first photosensitive organic layer.

16. A device, comprising:
    a first tip electrode including a first nanowire;
    a second tip electrode including a second nanowire;
    a nano gap separating the first tip electrode from the second tip electrode;
    an insulating layer underlying the first tip electrode and the second tip electrode;
    a groove in the insulating layer, the groove overlapping the first and second tip electrodes;
    a photosensitive organic layer underlying the insulating layer; and
    a controller operable to cause polarized light to be directed onto the photosensitive organic layer while a deoxyribonucleic acid (DNA) strand passes through the nano gap.

17. The device of claim 16, further comprising:
a flexible substrate underlying the photosensitive organic layer;
wherein the flexible substrate, the photosensitive organic layer and the insulating layer are operable to deform when the photosensitive organic layer reacts to the polarized light.

\* \* \* \* \*